Oct. 15, 1963    K. PALMER    3,106,906
CROSSPIECE AND BALANCE SCREW FOR INSTRUMENTS AND THE LIKE
Filed March 8, 1962    2 Sheets-Sheet 1
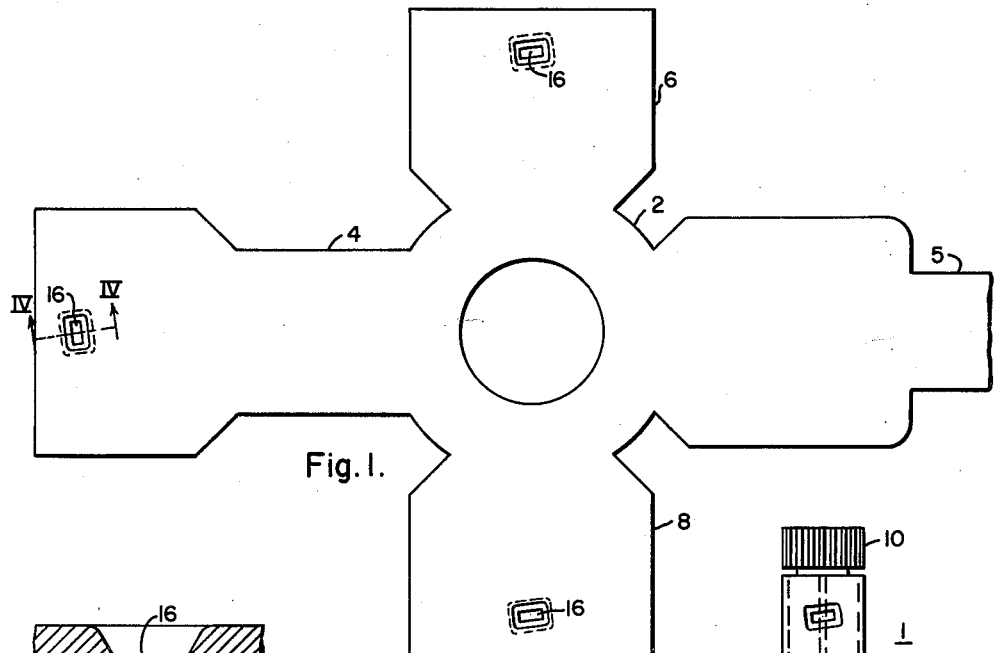
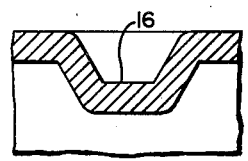
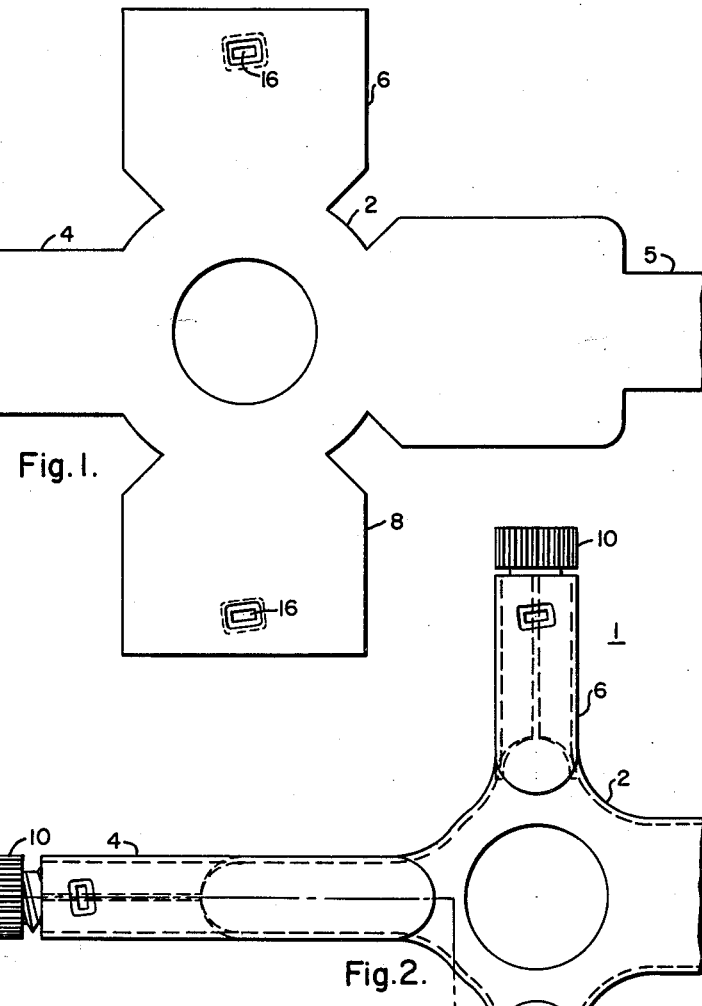
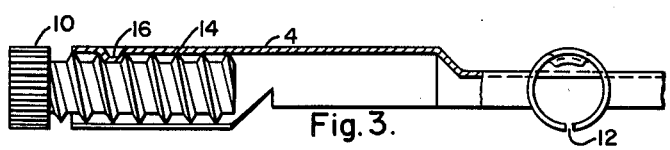
WITNESSES:
Bernard R. Gieguey
James T. Young
INVENTOR
Karl Palmer
BY John L. Houghton
ATTORNEY Oct. 15, 1963 K. PALMER 3,106,906
CROSSPIECE AND BALANCE SCREW FOR INSTRUMENTS AND THE LIKE
Filed March 8, 1962 2 Sheets-Sheet 2

United States Patent Office 3,106,906
Patented Oct. 15, 1963

3,106,906
CROSSPIECE AND BALANCE SCREW FOR INSTRUMENTS AND THE LIKE
Karl Palmer, West Orange, N.J., assignor to Westinghouse Electric Corporation, East Pittsburgh, Pa., a corporation of Pennsylvania
Filed Mar. 8, 1962, Ser. No. 178,357
9 Claims. (Cl. 116—136.5)

This invention relates generally to a crosspiece and balance weight for use in delicate apparatus such as electrical indicating instruments.

Numerous prior art crosspieces having balancing weights have been used but each thereof has certain disadvantages, as for example, in one form of prior art crosspiece having rod-like projections, fingered springs which serve as the balance weights, are slipped over the rod and are movable longitudinally of the rod-like portion to provide the desired balancing effect. In this type of crosspiece balancing trouble is encountered in properly locating the weight along the elongated portion since it is difficult to accurately control its adjusting movement. Furthermore, these weights are usually not symmetrical and any rotation tends to throw the crosspiece off balance.

Another form of crosspiece and balance weight comprises a helically coiled spring which is slid longitudinally of the elongated finger portion to obtain balance. Again this weight is difficult to accurately locate to give proper balance. Both of these types of slidable balancing weights have a tendency to move over a period of time due to jarring and other movement of the instrument.

A still further form of crosspiece and balance screw is the type which utilizes an internally threaded nut screw threaded on an externally threaded elongated member. This to a great extent solves the problem of locating the balance weight longitudinally on the supporting member, but is quite expensive. Furthermore, it is very difficult if not impossible to make the nut symmetrical about its longitudinal axis and unless the nut is symmetrical, rotation of the nut provides undesired changes in the balance of the crosspiece.

It is an object of this invention to provide a new type of crosspiece and balance weight therefor which overcomes the difficulties of the prior art types.

Another object is to provide a crosspiece and balance screw which is economical to manufacture in quantities Further objects will be apparent from the specification, the appended claims and the drawings in which drawings:

FIGURE 1 is a developed plan view of a portion of a cross arm embodying the invention;

FIG. 2 is a view of the same portion of the cross arm in its formed condition showing two of the balance screws inserted in two of the arms of the crosspiece;

FIG. 3 is a view taken substantially along the line III—III of FIG. 2 and looking in the direction of the arrows;

FIG. 4 is an enlarged view showing the embossed portion which cooperates with the threads on the balance screw to aid in the initial insertion of the screw and as an aid to locate the screw for reinsertion when the screw has been removed for any reason;

Figure 5:
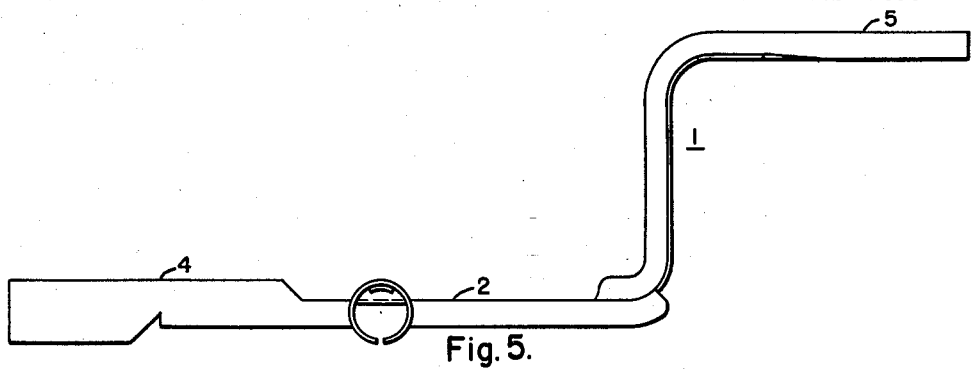
FIG. 5 is a side view of the balance arm showing the offset portion which carries the indicating pointer.

Referring to the drawings by characters of reference, the numeral 1 indicates generally a crosspiece particularly adapted for use in electrically actuated instruments such as ammeters and voltmeters. The crosspiece 1 comprises a base portion 2 provided with a longitudinally extending arm portion 4 which is aligned with and extends in opposite direction to a pointer supporting portion 5. Aligned arm portions 6 and 8 extend oppositely outwardly from the base portion 2 in a direction laterally to the portion 4. Balance screws 10 are shown threaded into the arms 4 and 6 and a similar balance screw (not shown) is to be inserted into the arm 8. Balancing is accomplished by rotation of the screws 10 whereby the crosspiece and the usual coil (not shown) to which it is attached may be balanced for proper functioning of the instrument.

The balance screws 10, best illustrated in FIG. 3, are preferably fabricated of a material which is harder than that of the crosspiece 1 and are provided with screw threads having sharp edges 14 which embed themselves slightly in the inner wall of the arm when the screw is threaded thereinto. In order that the screw 10 may be removed and easily reinserted in the same relative position, each arm is provided with a deformed or embossed portion 16 which is received in the space between adjacent threads as the balance screw is threaded into the arm.

As illustrated in FIG. 1, the crosspiece is preferably a sheet metal stamping illustrated in part in FIG. 1. The embossments 16 may be made in the arms at the same time that the stamping is made. Subsequently, the arms 4, 6 and 8 are formed into cylindrical shape and of an internal diameter which is slightly less than the outer diameter of the threads of the balance screws 10. Preferably, a space 12 is left between the adjacent edges of the arm cylinders to enable the internal diameter thereof to be held to a more uniform dimension. The resulting pressure of the cross-arm around the screws 10 resulting from the spring tension formed arms results in a locking action, thus resisting any movement of the screw that might otherwise result from for example vibration or shock. The screws 10 may be made in a screw machine or other similar apparatus and may be made with their weight symmetrically arranged about their longitudinal axis so that rotation of the screw, apart from its inwardly or outwardly movement, does not affect the balance of the crosspiece 1.

Figure 6:
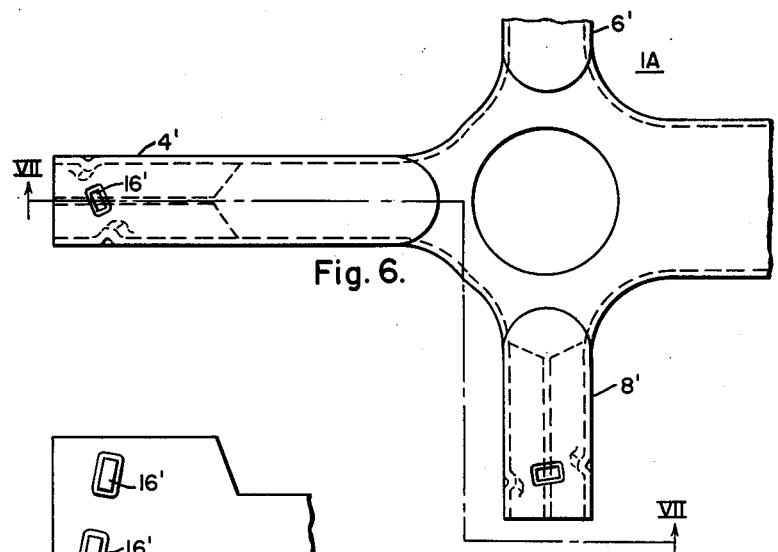
FIG. 6 is a view similar to FIG. 2 showing a modified form of the invention.
Figure 8:
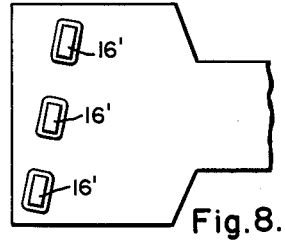
Figure 7:
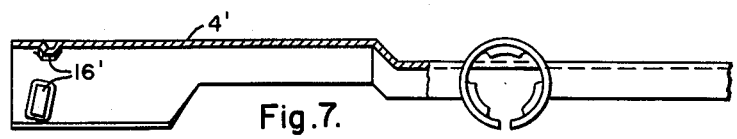
FIG. 7 is a view taken substantially along the line VII—VII of FIG. 6 and looking in the direction of the arrows; and, FIG. 8 is a developed partial view showing the embossed portions as used in the modified form of FIGS. 6 and 7.

The crosspiece 1A illustrated in FIGS. 6, 7 and 8 is in many respects similar to that of the crosspiece 1; the difference being in the number of the embossments 16' are provided instead of the single embossment 16 in the form shown in FIGS. 1 to 5. The embossments 16' of each arm 4', 6' and 8', respectively, are arranged in a row extending diagonally across the crosspiece in its blanked out form as illustrated in FIG. 8. When so located they will, when the arms are formed into cylindrical shape, lie in a helix and between the screw threads when the screws are threaded thereinto.

Although the invention has been described with reference to certain specific embodiments thereof, numerous modifications are possible and it is desired to cover all modifications falling within the spirit and scope of the invention.

What is claimed and is desired to be secured by United States Letters Patent is as follows:

1. A crosspiece for an instrument comprising a piece of sheet material having an elongated portion with spaced edges, said elongated portion being cylindrically shaped with said edges in adjacent relationship to define a hollow cylinder, said elongated portion having a protuberance spaced from and intermediate said edges and extending inwardly of said cylinder, and an externally threaded screw snugly fitting the inner surface of said cylinder and threadedly positioned within said cylinder with said protuberance extending into a space between adjacent ones of the threads of said screw.

2. A crosspiece for an instrument comprising a piece of sheet material having an elongated portion with spaced edges, said material being cylindrically shaped with said edges in adjacent relationship to define a hollow cylinder, said elongated portion having a protuberance spaced from and intermediate said edges and extending inwardly of said cylinder, and an externally threaded screw threadedly positioned within said cylinder with said protuberance extending into a space between adjacent ones of the threads of said screw, the diameter of said cylinder being less than the outer diameter of the threads of said screw prior to the insertion of said screw into said cylinder.

3. An article of manufacture comprising a structure having a main supporting portion and an elongated outwardly extending arm, said arm comprising an elongated single piece of sheet material extending outwardly from said main portion and having spaced edge portions, said elongated piece being formed to provide a hollow substantially cylindrical body with said edge portions in substantial face to face relation, and an externally threaded elongated weight member screwthreadedly secured within said hollow body, the outer diameter of the threads of said weight member being greater than the internal diameter of said hollow body, said threads of said weight member being harder than the material of the inner surface of said hollow body whereby initial entry of said weight member will provide grooves in said inner surface.

4. An article of manufacture comprising a structure having a main supporting portion and an elongated outwardly extending arm, said arm comprising an elongated single piece of sheet material having spaced edge portions extending outwardly from said main portion and formed to provide a hollow substantially cylindrical body with said spaced edge portions in substantial face to face relation, and an externally threaded elongated weight member screwthreadedly secured within said hollow body, the outer diameter of the threads of said weight member being greater than the internal diameter of said hollow body, said threads of said weight member being harder than the material of the inner surface of said hollow body whereby initial entry of said weight member will provide grooves in said inner surface, at least one portion of said inner surface adjacent an end portion of said hollow member being deformed inwardly into the hollow interior of said hollow member to provide a guide which is receivable between two adjacent threads of said weight member threads to facilitate the screwthreading of said weight member into said hollow member.

5. A crosspiece for an instrument comprising a piece of sheet material having at least one elongated extending portion with laterally extending edges, said portion being formed to define a hollow cylindrical portion having a wall all portions of which are sections of a cylinder, said wall being provided intermediate said edges with a deformed portion protruding into said cylinder, said edges being slightly spaced from each other when said wall is unstressed to permit the forming of said wall to exact size.

6. A crosspiece for an instrument comprising a piece of sheet material having at least one elongated extending portion with laterally extending edges, said portion being formed to define a hollow cylindrical portion having a wall all portions of which are sections of a cylinder, said wall being provided intermediate said edges with a deformed portion protruding into said hollow cylindrical portion, said deformed portion being elongated and extending at an acute angle with respect to the longitudinal axis of said hollow cylindrical portion, said edges being slightly spaced from each other when said wall is unstressed to permit the forming of said wall to exact size.

7. A crosspiece for an instrument comprising a piece of sheet material having at least one elongated extending portion with laterally extending edges, said portion being formed to define a hollow cylindrical portion having a wall all portions of which are sections of a cylinder, said wall being provided intermediate said edges with a deformed portion protruding into said hollow cylindrical portion, said edges being slightly spaced from each other when said wall is unstressed to permit the forming of said wall to exact size, and an externally threaded cylindrical weight member, at least the outer portions of the threads on said weight member being of an external diameter greater than the inner diameter of said hollow cylindrical portion in the unstressed condition of said wall, said deformed portion being sized to be received between any two adjacent ones of said threads.

8. A crosspiece for an instrument comprising a piece of sheet material having at least one elongated extending portion with laterally extending edges, said portion being formed to define a hollow cylindrical portion having a wall all portions of which are sections of a cylinder, said wall being provided intermediate said edges with a deformed portion protruding into said hollow cylindrical portion, said edges being slightly spaced from each other when said wall is unstressed to permit the forming of said wall to exact size, and an externally threaded cylindrical weight member, at least the outer portions of the threads on said weight member being harder than the inner surface of said hollow cylindrical portion and of an external diameter greater than the inner diameter of said hollow cylindrical portion in the unstressed condition of said wall whereby screwthreaded entry of said weight member into said cylindrical portion will cause said threads to cut into said wall to provide a predetermined relative position between said weight member and said wall for any rotative position of said weight member, said deformed portion being sized to be received between any two adjacent ones of said threads.

9. A crosspiece for an instrument comprising a piece of sheet material having at least one elongated extending portion with laterally extending edges, said portion being formed to define a hollow cylindrical portion having a wall all portions of which are sections of a cylinder, said wall being provided intermediate said edges with a deformed portion protruding into said hollow cylindrical portion, said edges being slightly spaced from each other when said wall is unstressed to permit the forming of said wall to exact size, and an externally threaded cylindrical weight member, at least the outer portions of the threads on said weight member being harder than the inner surface of said hollow cylindrical portion and of an extenal diameter greater than the inner diameter of said hollow cylindrical portion in the unstressed condition of said wall whereby screwthreaded entry of said weight member into said cylindrical portion will cause said threads to cut into said wall to provide a predetermined relative position between said weight member and said wall for any rotative position of said weight member, said deformed portion being sized to be received between any two adjacent ones of said threads, said deformed portions being elongated and extending at the angle with respect to the longitudinal axis of said cylinder as said threads.

References Cited in the file of this patent

UNITED STATES PATENTS

| | | |
|---|---|---|
| 2,426,777 | Lingel | Sept. 2, 1947 |
| 2,575,720 | Lenehan | Nov. 20, 1951 |